Oct. 14, 1958     H. W. BLETZ     2,856,489
PROBE THERMOSTAT
Original Filed Aug. 30, 1956
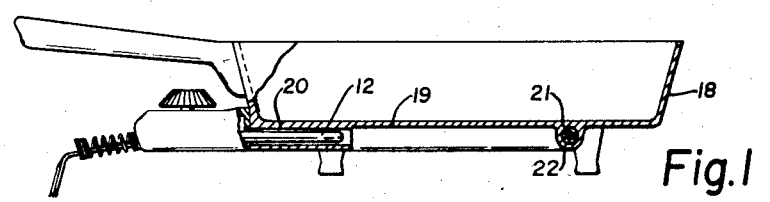
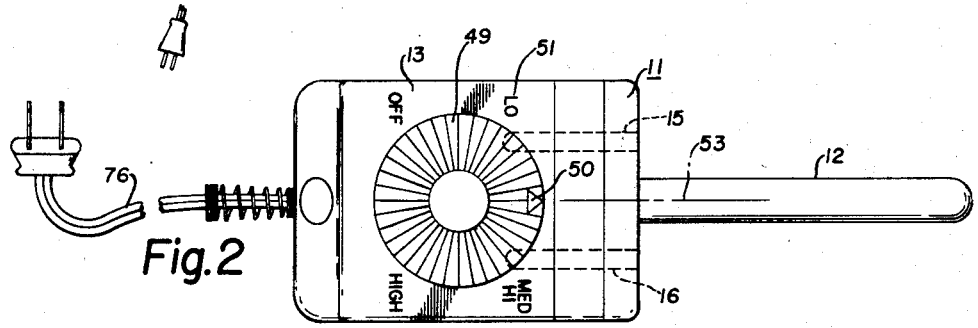
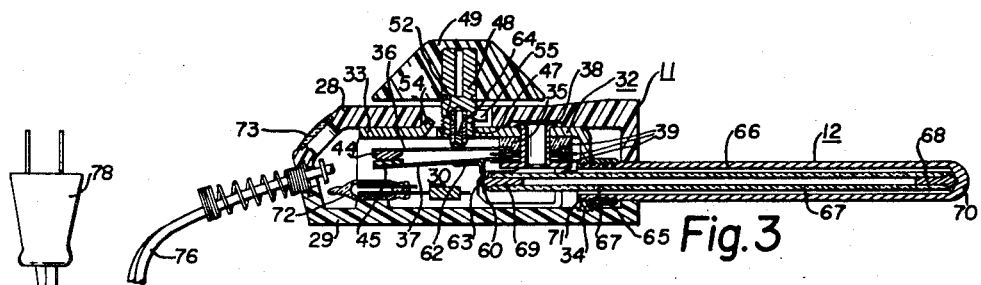
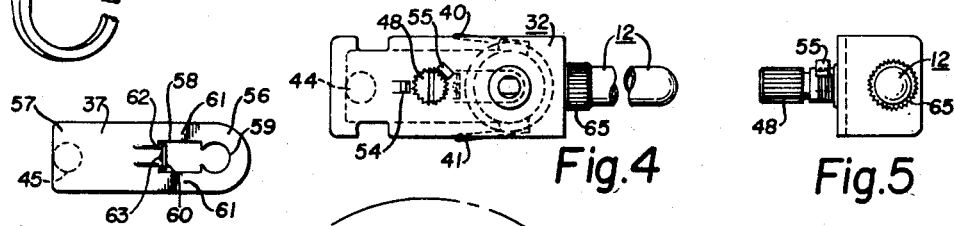
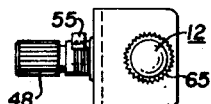
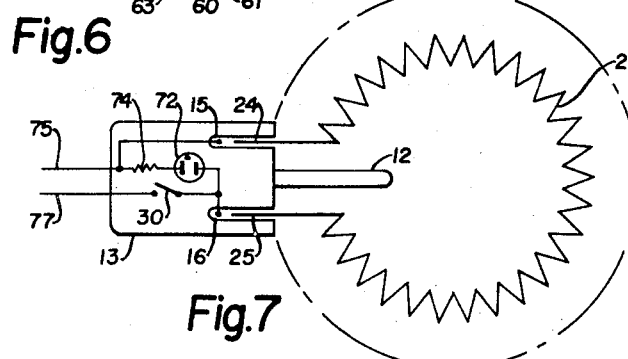
INVENTOR.
HOWARD W. BLETZ
BY Woodling and Krost,
atty.

United States Patent Office 2,856,489
Patented Oct. 14, 1958

2,856,489
PROBE THERMOSTAT

Howard W. Bletz, Lexington, Ohio, assignor to Stevens Manufacturing Company, Inc., a corporation of Ohio Original application August 30, 1956, Serial No. 607,110. Divided and this application March 17, 1958, Serial No. 721,890

7 Claims. (Cl. 200—136.5)

This application is a division of my application Serial No. 607,110, filed August 30, 1956; entitled "Probe Thermostat."

The prior art has shown long probe-like elements as a part of thermostatic switch devices but these have proved unsatisfactory in use in either life tests or reliability tests. One prior art form of probe type thermostatic switch device incorporated an expansible tube within which was contained a low expansion member welded at the outboard end to the outer expansion tube and the inner end pulled through a linkage on a switch contact to open the electrical switch. This prior art form thus relied upon the satisfactory performance of three different welds and, if any of these welds pulled loose, the device would not open the electrical circuit; and thus the electrical heating device supposedly under control would not be turned off but would continue to heat to its maximum capability thus creating a safety and fire hazard. This prior art form of thermostat also was very unreliable in calibration for repeated rotation of the adjusting screw as this changed the calibration markedly during the alleged useful life of the thermostat.

An object of the invention therefore is to provide a probe type thermostatic device which has long life and good reliability and which remains correctly calibrated throughout its life.

Another object of the invention is to provide a probe type thermostatic switch which forms a part of a connecting plug interconnecting a heating element of an electrical heating appliance and an energizing line cord.

Another object of the invention is to provide a probe type thermostatic switch which has a high expansion member of aluminum which is of heavy wall thickness and wherein an internal low expansion member is a vitreous product wherein the combination of these two members having different thermal co-efficients of expansion result in a thermostat with more thermal range and less critical adjustment of the entire thermostat.

Another object of the invention is to eliminate any welded linkage which would allow the contacts to remain in the closed position if any of the welds failed.

Another object of the invention is to provide a probe type thermostatic switch in which any breakage of the low expansion member would cause the thermostatic switch to fail in the open contact position or any fracture of this low expansion member due to abuse would cause a slight drop in the temperature calibration or cause the thermostat to fail in the open circuit condition.

Another object of the invention is to provide a thermostatic probe as a part of an electrical connector having a plastic housing wherein the thermostatic unit is complete in itself and does not depend upon the plastic housing to maintain the calibration of the thermostat.

Another object of the invention is to provide a thermostatic switch which may be pre-calibrated at the point of manufacture regardless of the design of the heating appliance with which the thermostat may be used.

Another object of the invention is to provide a probe type thermostat having an adjusting screw wherein repeated adjustments of this adjusting screw do not materially affect the temperature calibration for various settings of the adjusting screw.

Another object of the invention is to provide a thermostatic switch wherein contacts are mounted on spring blades of such material and construction as to maintain contact pressure and operating forces at high temperature of the probe.

Another object of the invention is to provide a probe type thermostatic switch which may be adjusted to and heated to its maximum temperature position and then adjusted to its low temperature position and back to the high temperature position and continuing this cycling indefinitely and yet maintaining an off position of the contacts of the switch whenever adjusted to the low temperature position.

Other objects and a fuller understanding of this invention may be had by referring to the following description and claims, taken in conjunction with the accompanying drawing, in which:

Figure 1 is an elevational view partly in section of a probe thermostat according to the invention connected to an electrical heating appliance illustrated as an electrical frying pan;

Figure 2 is a plan view of the probe thermostat;

Figure 3 is a longitudinal sectional view of the thermostat of Figure 2;

Figure 4 is a plan view of the probe thermostat removed from its insulating housing;

Figure 5 is an end view of the thermostat of Figure 4;

Figure 6 is a plan view of a contact blade removed from the thermostat; and

Figure 7 is a schematic circuit diagram of a circuit in which the probe thermostat may be used.

The Figures 2 and 3 show the construction of the entire probe thermostat 11 which includes a probe 12 and a control housing 13. The control housing 13 also includes an electrical plug including first and second female connectors 15 and 16. This probe thermostat 11 may be used in connection with an electrical heating appliance 18 which in this case has been shown for purposes of illustration as an electrical frying pan. This frying pan has a base 19 containing an elongated cylindrical aperture 20 and also containing a sealed-in heating element 21 shown schematically in Figure 7 and shown in Figure 1 as contained within a raised boss 22. The heating appliance 18 has first and second external male prongs 24 and 25 shown diagrammatically in Figure 7 to be received in the female connectors 15 and 16 when the probe 12 is received within the cylindrical aperture 20. This probe 12 is of a size and shape to be closely received within this aperture 20.

The control housing 13 includes upper and lower halves 28 and 29 connected together in any convenient manner, not shown, and generally may be made of some insulating material such as plastic or at least the exterior surface of this control housing 13 is insulated from the electrical switch mechanism 30 within the probe thermostat 11. This switch mechanism 30, as best shown in Figure 3, includes a rigid frame 32 which may be of metal and is generally L-shaped with long and short legs 33 and 34, respectively. A stack 35 is carried on the long leg of the frame near the junction of the long and short legs 33 and 34. This stack includes first and second spring contact blades of metal 36 and 37 with first ends thereof mounted in the stack 35. The stack 35 is fastened together by a rivet 38 and the blades 36 and 37 are mutually insulated and insulated from the frame 32 by insulating washers 39. Terminals 40 and 41 are also mounted in the stack 35 and are in electrical contact, respectively, with the contact blades 36 and 37.

First and second contacts 44 and 45 are carried on the outboard ends of the first and second resilient contact blades 36 and 37, respectively, for mutual cooperation; and these contact blades extend longitudinally of the frame 32 and of the control housing 13.

The frame 32 has a threaded aperture 47 in which is received an adjusting screw 48 which extends externally and transversely of the housing 13 to receive a control knob 49 having an index mark 50 cooperating with indicia 51 on the upper side of the control housing 13. This control knob 49 and adjusting screw 48 rotate to move an insulator pin 52 longitudinally of the axis thereof, which is transverse to the axis 53 of the control housing 13. The lower end of the insulator pin 52 contains a hardened bearing insert 64 for bearing against the contact blade 36. A stop lug 54 is pressed upwardly out of the metal of the frame 32 and this cooperates with a stud 55 fastened to the side of the adjusting screw 48 to limit the screw to approximately two hundred seventy degrees rotation. The insulator pin 52 bears against the upper side of the first contact blade 36 to resist the natural resiliency thereof which tends to move this blade 36 toward the frame long leg 33. Rotation of the knob 49 therefore raises and lowers the position of the first contact 44.

The second contact blade 37 is shown in Figure 6 as it appears before assembly into the probe thermostat 11, and the first end 56 thereof is that which is mounted in the stack 35 with the contact 45 mounted on the outboard end 57 thereof. A tongue or hinge aperture 58 is formed near the first end 56 and merges with a rivet aperture 59 formed to receive the rivet 38. The metal that formerly was in the plane of the contact spring 37 and was in the tongue aperture 58 is bent generally at right angles to form a tongue 60. This tongue may have reinforcing ribs 62 formed therein. The end of the tongue 60 has a socket depression 63. This socket depression 63 is along the axis 53 of the control housing 13 and along the axis of the probe 12. Hinge portions 61 lie on either side of the tongue aperture 58 and integrally join the first and outboard ends 56 and 57 of the contact blade 37.

This probe 12 is mounted on the frame 32 specifically on the short leg 34. The probe includes first and second members of different thermal coefficients of expansion and preferably includes a heavily walled aluminum tube 66 as an expansion member and an inner non-expansion or low expansion member 67. The inboard end of the aluminum tube 66 is threaded to be received in a threaded aperture 71 in the frame short leg 34 and is held in place by a lock nut 65. This inner member 67 is in the form of a rod or tube and may be a vitreous or porcelain-like or ceramic member. In the preferred embodiment this inner member 67 is tubular to receive hardened bearing members 68 and 69 at each end thereof. The bearing member 68 bears against the closed outer end 70 of the aluminum tube 66, and the bearing member 69 bears against the socket depression 63. The spring blade 37 has a natural resiliency tending to urge it downwardly or away from the frame long leg 33. This urging will cause a bending primarily at the hinge portions 61. With the electrical switch mechanism 30 completely assembled and the probe thermostat 11 at room temperature, the inner member 67 is under compression caused by the natural resiliency of contact blade 37 acting through the tongue 60. Therefore, this non-expansion member 67 acts to hold the second contact 45 in a given or determinable position. With this contact 45 so held, adjustment of the control knob 49 will permit the first contact 44 to be moved into and out of engagement with the contact 45.

The control housing 13 may also enclose a neon glow lamp 72 to be observed through a transparent window 73 in the upper part of the housing, and the circuit diagram of Figure 7 shows that this glow lamp 72 may be connected in series with a current limiting resistor 74 across the female connectors 15 and 16. The female connector 15 is connected to a first wire 75 of a two-wire flexible electrical supply cord 76, and the second wire 77 of this cord 76 is connected through the electrical switch mechanism 30 to the female connector 16.

In operation, the probe thermostat 11 may be plugged in to the electrical heating appliance 18 with the male prongs 24 and 25 received within the female connectors 15 and 16. When so positioned, the probe 12 will be closely received within the cylindrical aperture 20.

The control knob 49 may be rotated to the desired operating temperature and, when the probe 12 is at normal room temperature, this will mean that the contacts 44 and 45 are in engagement. If the control knob 49 is rotated to the off position shown in Figure 2, this will move the insulator pin 52 upwardly as shown in Figure 3 so as to raise contact 44 and open circuit contacts 44 and 45 of the switch mechanism 30. When the plug 78 is connected to an electrical outlet and the control knob 49 is rotated to an operating temperature condition, the switch 30 will be closed and the circuit will be completed through the heating element 21 to heat the frying pan 18. This heating will heat the base 19 and also heat the probe 12. This heat will be received by both of the members 66 and 67; but with the member 66 being of aluminum it will be a high expansion member relative to the inner member 67. This will move the outer end 70 of the tube 66 to the right as viewed in Figure 3; hence, the entire inner member 67 will move to the right because of the spring urging of the natural resiliency of the contact blade 37. This acts through the tongue 60 and thus the spring contact blade 37 will move downwardly to open circuit the contacts 44 and 45 at the pre-determined temperature setting of the control knob 49. When the contacts 44 and 45 are closed, this would complete a circuit through the glow lamp 72, but this lamp will be extinguished upon opening the contacts 44 and 45. Such opening also de-energizes the heating element 21 and thus the entire frying pan will cool. Such cooling will cause contraction of the aluminum tube 66 to urge the inner member 67 to the right to close the contacts 44 and 45. Again a heating portion of the cycle will be obtained to heat the base 19 and the aluminum tube 66 to again open the contacts 44 and 45 by moving the contact 45 away from contact 44 to thus start the cooling portion of the cycle. This alternating heating and cooling will continue as long as electrical energy is supplied through the electrical cord 76.

The control knob 49 may be rotated to any desired position which may be two hundred to five hundred degrees Fahrenheit, for example, and with electrical energy supplied to the probe thermostat 11, the temperature of the appliance 18 will adjust itself to the new operating temperature condition and then cycle through heating and cooling portions as recited above.

The probe thermostat 11 of the present invention has been found to be extremely long lived and reliable throughout its life as well as maintaining accurate temperature calibration throughout its life, with this temperature calibration being as obtained by the index mark 50 cooperating with the indicia 51.

In life tests under controlled identical conditions and identical heating appliances the present probe thermostat 11 has been found to drop in calibration by only seventeen degrees after over eight hundred hours continuous use, whereas the prior art unit employing welded construction dropped fifty-nine degrees in temperature calibration. This high consistency in temperature calibration throughout life is due to the heavily walled aluminum outer member 66 and the relatively rigid ceramic or porcelain inner member 67 which is stressed slightly in compression and which is very stable in dimensional characteristics throughout life regardless of being subjected for long periods of time to high temperatures, this coupled with the hardened bearing inserts 68 and 69 which assure closely controlled length dimensions of such inner member 67 throughout life. The probe thermostat 11 of the present invention has also been found to be highly reliable throughout life despite repeated rotation of the control knob, that is, adjustment of the operating temperature. The contact blades 36 and 37 are preferably made of heavy gauge stainless steel which successfully resists continued heating and which do not lose their spring tension. The particular construction of the probe thermostat 11, wherein the aluminum tube 66 is far removed from the contacts 44 and 45 and from the spring blades 36 and 37, and wherein there is not good heat transfer from the aluminum tube 66 to the frame 32, permits these spring blades 36 and 37 to be cool relative to the probe tube 66. This permits long life with these contact blades retaining their spring tension and not changing their calibrated position throughout life.

Still further, the inner member 67, being of a porcelain or ceramic material, transmits very little heat so that the tongue 60 does not become heated appreciably; and therefore, heat is not received by the contact blade 37 by this means. Also, the tongue 60 is reenforced by the ribs 62 so that the angular relationship of the tongue 60 and contact blade 37 remain constant throughout life with this contact blade 37 bending primarily at the hinge portions 61 which do not become heated to affect their reliability or elasticity.

In prior art thermostats the continued rotation of the control knob 49 for adjustment purposes changes the calibration of the thermostat throughout life. This has been found to be especially true where the thermostat has been adjusted for and is operating at a high temperature setting. If then the control knob is adjusted to a low temperature setting, this heavily stresses the various parts of the thermostat, and after only a very few such temperature calibration changes the prior art thermostats have been found to be incapable of opening the contacts; and therefore, there is no off position at the lower end of the temperature calibration range. With the construction of the present invention after stem rotation tests, it has been found that the temperature calibration changed only four degrees after five hundred total cycles of stem rotation from high to low back to high temperature settings, with the appliance and probe thermostat operating at the high temperature. The prior art form of thermostat, operating with an identical appliance and under identical conditions, increased in temperature calibration by forty-eight degrees for this same five hundred cycles of stem rotation tests; and additionally the thermostat was so damaged by this stem rotation test that it was incapable of open circuiting the contacts in the lowest temperature position and thus there was no electrical off condition capable of the thermostat after such test. The particular construction of the thermostat of the present invention, which permits this high degree of constancy in temperature calibration despite repeated adjusting screw rotation, is primarily caused by the short sturdy construction of the adjusting screw 48 and the insulator pin 52, together with the hardened bearing insert 64 to accurately position the contact blade 36. Also, the constancy of length dimension of the inner member 67, which is not stressed in tension but only stressed slightly in compression, and the fact that the contact blade 37 is not appreciably heated, all combine to give extraordinary constancy of temperature calibration even with cycling of position of the adjusting screw 48.

It will be noted that the entire working mechanism of the thermostat 11 is carried on the frame 32 so that there is no dependence on the housing 13 being in place and no dependence on the position of this control housing 13 to maintain calibration of the thermostat 11.

The use of the inner non-expansion member 67 as being a member stressed in compression is a safety feature because any breakage of this unit due to abuse or extremely rough handling results in a device which fails "safe." This is because the contacts 44 and 45 would be open circuited in such an event and thus the appliance 18 would not become overheated. Also, any fracture of the low expansion member 67 causes either a slight drop in temperature calibration or causes the thermostat to fail in an electrical open condition which is again a safety feature. This is in contradistinction to the prior art which relied on welded linkage and, if any of the welds fail, the device could fail in an electrical closed condition to thus provide an extremely unsafe condition.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostatic switch, comprising, a control housing having an axis, a frame within said housing, first and second metallic spring contact blades mounted at the first ends thereof on said frame in mutually insulated relationship and insulated from the exterior of said housing and each extending longitudinally in said housing, first and second contacts carried for mutual cooperation on the outboard ends of said first and second contact blades, respectively, means urging apart said first and second contacts, an adjustable screw carried on said frame and disposed to adjustably relatively position said first and second contacts, an L-shaped tongue fixedly attached to said second contact blade and with said tongue extending generally perpendicularly to said second contact blade and having a socket depression, a surface defining an aperture between said first end and said tongue in said second contact blade with said aperture being centrally located laterally on said second contact blade, first and second hinge portions of said second contact blade on either side of said tongue aperture and joining said first and outboard ends of said second contact blade, a heat expansible tube carried by said frame and extending longitudinally of and external of said housing, said tube having a closed outer end, a substantially non-heat-expansible member within said tube abutting the closed outer end thereof and abutting said socket depression on said L-shaped tongue to establish a determinable position of said second contact, whereby as said tube is heated it longitudinally expands and permits said urging means to bend said second contact blade at said hinge portions to move said second contact away from said first contact.

2. A thermostatic switch, comprising, a control housing having an axis, a frame within said housing, first and second metallic spring contact blades mounted at the first ends thereof on said frame in mutually insulated relationship and insulated from the exterior of said housing and each extending longitudinally in said housing, first and second contacts carried for mutual cooperation on the outboard ends of said first and second contact blades, respectively, means urging apart said first and second contacts, an adjustable screw carried on said frame and disposed to adjustably relatively position said first and second contacts, an L-shaped tongue fixedly connected near said first end of said second contact blade and with said tongue extending generally perpendicular to said second contact blade and having a socket depression, a surface defining a hinge aperture in said second contact blade between said first end and said tongue thereof with said hinge aperture being centrally located laterally on said second contact blade, first and second hinge portions of said second contact blade on either side of said hinge aperture and joining said first and outboard ends of said second contact blade, a heat expansible tube carried by said frame and extending longitudinally of and external of said housing, said tube having a closed outer end, a substantially non-heat-expansible member within said tube abutting the closed outer end thereof and abutting said socket depression on said L-shaped tongue to establish a determinable position of said second contact, whereby as said tube is heated it longitudinally expands and permits said urging means to bend said second contact blade at said hinge portions to move said second contact away from said first contact.

3. A thermostatic switch, comprising, a metallic frame with L-shaped long and short legs with said long leg having an axis, first and second spring contact blades with at least one mounted near the junction of said long and short legs in mutually insulated relationship and each extending longitudinally relative to said frame, first and second contacts carried for mutual cooperation on the outboard ends of said first and second contact blades, respectively, means urging apart said first and second contacts, an adjustable screw carried on said frame and disposed to adjustably relatively position said first and second contacts, first and second female electrical connectors disposed axially parallel to said frame with said first connector being electrically connected through said contacts to an electrical supply cord, an L-shaped tongue fixed to said second blade and extending generally perpendicularly away from said frame and having a socket, a tube aperture in said frame short leg, a heat expansible tube carried in said tube aperture and extending longitudinally of said frame, said tube having a closed outer end, a substantially non-heat-expansible member within said tube abutting the closed outer end thereof and abutting said socket on said L-shaped tongue to establish a determinable position of said second contact, whereby as said tube is heated it longitudinally expands to permit said urging means to relatively move apart said first and second contacts.

4. A thermostatic switch, comprising, a control housing having an axis, a metallic frame within said housing, said frame having L-shaped long and short legs, means for holding said frame within said housing with said long leg longitudinally disposed, first and second spring contact blades with one mounted near the junction of said long and short legs in mutually insulated relationship and insulated from the exterior of said housing and each extending longitudinally in said housing, first and second contacts carried for mutual cooperation on the outboard ends of said first and second contact blades, respectively, means urging apart said first and second contacts, an adjustable screw carried on said frame and disposed to adjustably relatively position said first and second contacts, first and second female electrical connectors disposed axially parallel in said housing and electrically connected through said contacts to a two wire supply cord, an L-shaped tongue fixed to said second blade and extending generally perpendicularly away from said frame and having a socket depression, a tube aperture in said frame short leg, a heat expansible tube fixedly carried in said aperture and extending longitudinally of and externally of said housing, said tube having a closed outer end, a substantially non-heat-expansible member within said tube abutting the closed outer end thereof and abutting said socket depression on said L-shaped tongue to establish a determinable position of said second contact, whereby as said tube is heated it longitudinally expands and permits said urging means to relatively move apart said first and second contacts.

5. A thermostatic switch, comprising, a control housing of electrical insulating material and having an axis, a metallic frame within said housing, said frame having L-shaped long and short legs, means for holding said frame within said housing with said long leg longitudinally disposed, a stack mounted on said long leg near the junction with said short leg, first and second spring contact blades with at least one thereof mounted in said stack and in mutually insulated relationship and each extending longitudinally in said housing, first and second contacts carried for mutual cooperation on the outboard ends of said first and second contact blades, respectively, means urging apart said first and second contact blades, an adjustable screw carried on said frame and disposed to abut one of said contact blades to adjustably relatively position said first and second contacts, first and second female electrical connectors disposed axially parallel in said housing and electrically connected through said contacts to a two wire supply cord, an L-shaped tongue fixed to said second blade and extending generally perpendicularly away from said frame long leg and having a socket depression, a tube aperture in said frame short leg, a heat expansible tube fixedly carried in said aperture and extending longitudinally of and external of said housing, said tube having a closed outer end, a substantially non-heat-expansible rod within said tube abutting the closed outer end thereof and abutting said socket depression on said L-shaped tongue to hold said second contact in a determinable position relative to said first contact, whereby as said tube is heated it longitudinally expands and permits said urging means to move said second contact out of engagement with said first contact.

6. A thermostatic switch, comprising, a control housing of electrical insulating material and having an axis, a metallic frame within said housing, said frame being L-shaped with long and short legs, means for holding said frame within said housing with said long leg longitudinally disposed, a stack mounted on said long leg near the junction with said short leg, first and second spring contact blades mounted in said stack in mutually insulated relationship and each extending longitudinally in said housing, first and second contacts carried for mutual cooperation on the outboard ends of said first and second contact blades, respectively, said first blade being between said frame and said second contact blade and having natural resiliency urging same toward said frame, said second blade having natural resiliency urging same away from said first blade, an adjustable screw carried on said frame and disposed to abut said first blade to adjustably position said first contact relative to said frame, first and second female electrical connectors disposed axially parallel in said housing and electrically connected through said contacts to a two wire supply cord, an L-shaped tongue fixed to said second blade and extending generally perpendicularly away from said frame and having a socket depression, a threaded aperture in said frame short leg, a heat expansible tube threaded in said aperture and extending longitudinally of and external of said housing, said tube having a closed outer end, a substantially non-heat-expansible rod insulatedly carried within said tube and abutting the closed outer end thereof and abutting said socket depression on said L-shaped tongue to urge said second contact toward engagement with said first contact, whereby as said tube is heated it longitudinally expands and permits the natural resiliency of said second blade to move said second contact out of engagement with said first contact.

7. A thermostatic switch, comprising, a control housing of electrical insulating material and having an axis, a metallic frame within said housing, said frame being L-shaped with long and short legs, means for holding said frame within said housing with said long leg longitudinally disposed, a stack mounted on said long leg near the junction with said short leg, first and second spring contact blades mounted in said stack and each separately insulated from said frame and each extending longitudinally in said housing, first and second contacts carried for mutual cooperation on the outboard ends of said first and second contact blades, respectively, said first blade being between said frame and said second contact blade and having natural resiliency urging same toward said frame, said second blade having natural resiliency urging same away from said first blade, an adjustable screw carried on said frame perpendicular to said axis and disposed to abut said first blade to adjustably position said first contact away from said frame against the urging of said first contact blade, a control knob on said screw, first and second female electrical connectors disposed axially parallel in said housing, means for electrically connecting said first female connector through said contacts to one wire of a two wire supply cord and means for connecting said second female connector to the other wire of said supply cord, an L-shaped tongue fixed to said second blade and extending generally perpendicularly away from said frame and having a socket depression facing said short leg of said frame, a threaded aperture in said frame short leg aligned with said socket depression, a heat expansible tube threaded in said aperture and extending longitudinally of and external of said housing, said tube having a closed outer end, a substantially non-heat-expansible ceramic rod within said tube abutting the closed outer end thereof and abutting said socket depression on said L-shaped tongue to urge said second contact toward engagement with said first contact, whereby as said tube is heated it longitudinally expands and permits the natural resiliency of said second blade to move said second contact out of engagement with said first contact.

References Cited in the file of this patent

UNITED STATES PATENTS

| | | |
|---|---|---|
| Re. 20,570 | Bushway | Dec. 7, 1937 |
| 1,431,542 | Ross | Oct. 10, 1922 |
| 2,496,229 | Parkhurst | Jan. 31, 1950 |
| 2,705,745 | Matthysse et al. | Apr. 5, 1955 |

FOREIGN PATENTS

| | | |
|---|---|---|
| 543,995 | Germany | Feb. 12, 1932 |